3,734,754
THERMALLY DARKENING PHOTOCHROMIC GLASS
Lyman James Randall and Thomas P. Seward III, Corning, N.Y., assignors to Corning Glass Works, Corning, N.Y.
No Drawing. Filed Aug. 19, 1970, Ser. No. 65,270
The portion of the term of the patent subsequent to Nov. 21, 1989, has been disclaimed
Int. Cl. C03c 3/14, 3/26, 3/30
U.S. Cl. 106—47 R   5 Claims

ABSTRACT OF THE DISCLOSURE

This invention relates to articles comprising lanthanum borate glasses which exhibit unusual photochromic behavior. This photochromism is characterized by a darkened thermally stable state and by bleaching to a clear state in response to actinic radiation. These glasses are further characterized by the fact that they become colorless above a certain high temperature and colored again when the temperature is lowered below a certain critical value.

---

The co-pending application of R. J. Araujo, L. G. Sawchuk, and T. P. Steward III, Ser. No. 65,271, filed concurrently herewith, entitled High Refractive Index Photochromic Glasses, discloses a related family of lanthanum-borate glasses exhibiting excellent photochromic behavior which are distinguishable from the glasses of the present invention by the fact that they are not necessarily thermally darkenable.

Transparency is one of the obvious characteristics of most common glasses. One can visualize situations in which one would wish the transparency or transmission of a material to change in response to some stimulus. An example of a material showing such a response is the photochromic glass described in U.S. Pat. No. 3,208,860. Such a photochromic glass darkens in response to actinic irradiation and reverts to a colorless thermally stable state upon cessation of irradiation.

The glass described in this invention is dark in its stable state. Further, the optical density of the darkened state increases with temperature. The glass bleaches to a clear state by the action of visible light at a rate which increases with the intensity of the light. Upon cessation of the radiation, the material returns to its stable darkened state at a rate which depends on the temperature. For example, at low temperatures such as room temperature, the material is completely bleached with relatively low levels of light. At higher temperatures, such as 300° C., the glass remains dark in spite of relatively intense bleaching light. At intermediate levels of temperature and light intensity the steady state transmission has intermediate values.

If the temperature of the glass is raised above some critical temperature, the glass changes discontinuously to a colorless state irrespective of the presence of bleaching radiation. If the temperature is then lowered below a second critical temperature the glass returns discontinuously to the darkened state.

These two effects characterizing this invention are predicated on a material containing silver halide crystallites suspended in particular host glasses. Why the dark state is the stable one is not understood in detail; however, it is known to be associated with the crystalline state of the silver halide particles and to the lanthanum-borate host glasses. The disappearance and reappearance of the darkened state when cycling the glass through the critical temperatures is clearly associated with the silver halide crystalline state. For example, in silver chloride-doped glasses, the clearing occurs at about 450° C. and the redarkening occurs at about 325° C. These temperatures correspond respectively to the melting temperature and the homogeneous nucleation temperature for crystallization of silver chloride.

It is an object of the present invention to provide a range of glass compositions which, when properly melted and heat treated, will display the characteristics described above.

It is another object of the present invention to provide a material the visible transmission of which is abruptly switched by small changes in temperature. Hysteresis in the switching provides bistable operation and memory. Such an effect might find application in information storage or system control.

It is another object of this invention to provide a material in which information may be written and stored by localized changes in temperature of the material, such as may be effected by electron beam, infrared laser, or electrical resistance heating.

It is another object of this invention to provide a material which has a visible transmission that decreases with increasing temperature. By way of example, such a material, used as windows, would regulate the amount of light entering a room when the temperature is high as in the summertime.

It is another object of this invention to provide a material in which information may be written and stored by means of irradiation with visible light.

It is another object of this invention to provide a material with a superlinear transmission with regard to visible light, i.e., a material the transmittance of which increases with the intensity of incident light. Such an effect is important in contrast enhancement devices.

Numerous other objects and uses of the present invention will become apparent from the following detailed description thereof.

Specifically, our invention comprises photochromic thermally darkenable glasses containing microcrystals of at least one silver halide selected from the group consisting of silver chloride, silver bromide, and silver iodide, said microcrystals comprising at least about 0.005% by volume of the glass. These glasses contain, in weight percent, at least about 0.15% Ag, at least one halide in the indicated minimum effective proportion of about 0.1% Cl, about 0.1% Br, and about 0.1% I, at least about 0.004% CuO, and a weight ratio of Ag to halide of at least about 1:1.

Such glasses may be obtained by melting a batch for a lanthanum-borate glass which is potentially thermally darkenable consisting essentially, in weight percent on the oxide basis as calculated from the batch, of 15–75% $La_2O_3$, 13–65% $B_2O_3$, 0.004–0.4% CuO, 0.2–6.0% Ag, and at least one halide selected from the group consisting of 0.2–1.5% Cl, 0.2–1.5% Br, and 0.2–1.5% I, where Ag, CuO, and the halides are calculated as amounts in excess of the base glass composition. Various other oxide additions may be made to the batch, if desired, to improve the stability of the glass without destroying its thermal darkening properties, as long as $La_2O_3$ and $B_2O_3$ are present in amounts totalling at least 35% by weight of the batch. Such additions may include one or more oxides in the indicated proportions, in weight percent on the oxide basis as calculated from the batch, selected from the group consisting of 0–40% $Ta_2O_5$, 0–40% $Nb_2O_5$, 0–15% $Al_2O_3$, 0–45% $ThO_2$, 0–15% $TiO_2$, 0–15% $ZrO_2$, and 0–30% RO, wherein RO consists of at least one of the bivalent metal oxides from the group consisting of ZnO, CdO, CaO, SrO, BaO, MgO, and PbO. In addition, small amounts of other oxides known to be useful in glass compositions may be added, provided they do not adversely affect the thermal darkening properties. For example, small quantities of the alkali metal oxides such as $Li_2O$, $K_2O$, $Na_2O$, $Cs_2O$, and $Rb_2O$ may be included in the batch, but the concentrations should be kept low (less than about 1%) since these components tend to cause opalization in the glass. The addition of $SiO_2$ is preferably to be avoided, although minor amounts (not more than about 10%) may be tolerated, since it tends to cause opalization of the glass and loss of thermally darkenable properties.

It is preferred that chloride be included among the halides present in the glass, and that a silver to halide ratio of at least 1:1 be maintained in formulating the batch, although the volatility of these components will affect their concentrations during processing.

Although all glasses in the range of compositions specified herein will exhibit some thermally darkenable behavior, it is found that the stability of the glass and the manner and extent of the thermally darkenable behavior depends upon certain variables of composition and treatment about which some generalizations may be drawn.

First, the thermal darkening effect requires a lanthanum-borate glass for the base material and does not depend greatly on the presence or absence of the other basic glass constituents, if the specified quantities are not exceeded. In fact, the effect may be obtained in any lanthanum-borate binary composition which will produce a good glass. Generally, however, for any particular combination of components, the useful compositions are limited at high $La_2O_3$ levels by a tendency towards devitrification on cooling, and at low $La_2O_3$ levels by devitrification or by the formation of a two-phase system, the upper limit of $La_2O_3$ being about 75% and the lower limit about 15%. Compositions are limited at high $B_2O_3$ levels by a tendency to form two liquid phases in the melt and at low $B_2O_3$ levels by devitrification, the upper limit of $B_2O_3$ being about 65% and the lower limit about 13%. Limits are imposed at high levels of the other components by a decrease or loss of attainable thermal darkening properties. The maximum upper limits in all cases depend on the specific system being considered.

Second, the thermal darkening effect is rather sensitive to both the amount of silver and to the ratio of silver-to-halide present, with the optimum amounts and ratios depending on the composition of the base glass. Too low a silver level results in the loss of thermal darkening effects while too high a level results in an opal glass, which for some applications may be undesirable. The best results are obtained with silver concentrations as calculated from the batch, in the range of 0.4–1.25% by weight. The best properties also seem to be obtained when the silver concentration lies between 1 and 4 times that of the halide concentration. Lower amounts of halide leave the glass with a residual rose color which cannot be removed by bleaching with visible light, while higher amounts result in the loss of thermal darkening properties, and in extreme cases opalization or loss of transparency in the glass. Generally, glasses of higher lanthanum concentrations require lower silver concentrations and lower silver-to-halide ratios to obtain good thermal darkening characteristics than do glasses of lower lanthanum concentrations.

As is well known, halides are prone to volatilize during the melting process and such losses can exceed 50% of the amount added to the batch depending on the melting temperature and time, the type of melting unit employed, and the concentration of halide in the melt. Likewise, silver can also be lost from the batch during melting, probably due to volatilization of silver halide, but the amount lost is only on the order of 20% of that added. Consequently, concentrations of silver and the halides as calculated from the batch, cannot be taken as the concentrations found in the end product glass, which probably do not exceed about 4.0% and 1.5% respectively. However, for any particular set of circumstances, one can readily adjust the batch composition to compensate for such losses.

Third, small amounts of CuO are necessary to obtain good optical bleaching of the thermally darkened glass, with quantities in the range from 0.016–0.064% by weight being preferred.

Fourth, fluorine may be added to the glass batch to improve its melting qualities. The effects of fluorine on the thermal darkenability of the glass, if any, are not known but the amount utilized is kept low in order to forestall the precipitation of fluorides within the glass.

Examples of glasses having the potential of developing good thermal darkening properties after suitable heat treatment thereof are set forth in Table I on a weight percent basis as calculated from the batch. The concentrations of silver, the halogens, and the copper oxide sensitizer are expressed in accordance with conventional practice as percent by weight in excess of the total glass composition, in which the sum of the constituents listed other than silver, the halogens, and copper oxide totals approximately 100%. These compositions are included by way of further illustration and are not intended to be limiting.

TABLE I

|  | 1 | 2 | 3 | 4 | 5 |
|---|---|---|---|---|---|
| $B_2O_3$ | 34.4 | 39.2 | 29.5 | 38.8 | 29.5 |
| $La_2O_3$ | 63.9 | 59.1 | 49.3 | 50.0 | 59.1 |
| CdO | 1.0 | 1.0 | 20.9 | 10.9 | 1.3 |
| ZnO |  |  |  |  | 9.8 |
| $Al_2O_3$ | 0.7 | 0.7 | 0.3 | 0.3 | 0.3 |
| Ag | 0.74 | 0.74 | 0.74 | 1.02 | 0.74 |
| Cl | 0.49 | 0.49 | 0.73 | 0.50 | 0.73 |
| F | 0.49 | 0.49 |  |  |  |
| CuO | 0.03 | 0.03 | 0.03 | 0.03 | 0.03 |

|  | 6 | 7 | 8 | 9 | 10 |
|---|---|---|---|---|---|
| $B_2O_3$ | 39.3 | 44.5 | 42.1 | 39.7 | 21.7 |
| $La_2O_3$ | 39.4 | 44.5 | 46.8 | 49.5 | 50.6 |
| CdO | 1.3 | 0.9 | 0.9 | 0.5 | 0.7 |
| ZnO | 19.7 |  |  |  |  |
| CaO |  | 9.8 |  |  |  |
| SrO |  |  | 9.9 |  |  |
| BaO |  |  |  | 9.9 |  |
| $SiO_2$ |  |  |  |  | 1.9 |
| $Al_2O_3$ | 0.3 | 0.3 | 0.3 | 0.3 | 1.0 |
| $Ta_2O_5$ |  |  |  |  | 24.1 |
| Ag | 0.75 | 1.25 | 1.00 | 0.75 | 0.75 |
| Cl | 0.73 | 0.50 | 0.50 | 0.30 | 0.30 |
| F |  |  |  |  | 0.50 |
| CuO | 0.03 | 0.032 | 0.032 | 0.032 | 0.032 |

|  | 11 | 12 | 13 | 14 | 15 |
|---|---|---|---|---|---|
| $B_2O_3$ | 21.3 | 21.3 | 25.4 | 20.2 | 37.2 |
| $La_2O_3$ | 49.6 | 49.6 | 49.3 | 47.0 | 57.0 |
| CdO | 0.7 | 0.7 | 0.6 | 0.6 | 0.5 |
| $SiO_2$ | 3.8 |  |  |  |  |
| $TiO_2$ |  |  |  | 8.9 |  |
| $ThO_2$ |  |  |  |  | 5.0 |
| $Al_2O_3$ | 1.0 | 4.8 | 0.6 |  | 0.3 |
| $Ta_2O_5$ | 23.6 | 23.6 | 24.1 | 22.4 |  |
| Ag | 0.75 | 0.75 | 1.00 | 0.75 | 0.75 |
| Cl | 0.30 | 0.30 | 0.25 | 0.30 | 0.30 |
| F | 0.50 | 0.50 | 0.50 | 0.50 |  |
| CuO | 0.032 | 0.032 | 0.032 | 0.032 | 0.032 |

|  | 16 | 17 | 18 | 19 | 20 |
|---|---|---|---|---|---|
| $B_2O_3$ | 34.7 | 34.6 | 32.2 | 15.8 | 17.3 |
| $La_2O_3$ | 44.7 | 54.6 | 47.1 | 19.3 | 56.3 |
| CdO | 0.6 | 0.6 | 0.6 | 5.0 | 1.1 |
| ZnO |  |  |  | 4.6 |  |
| ThO | 19.7 |  |  | 27.5 |  |
| $Al_2O_3$ | 0.3 | 0.3 | 0.3 | 1.2 | 0.8 |
| $Nb_2O_5$ |  | 9.9 | 19.8 | 13.8 |  |
| $Ta_2O_5$ |  |  |  | 11.0 | 24.6 |
| $As_2O_3$ |  |  |  | 1.8 |  |
| Ag | 0.75 | 0.75 | 0.75 | 2.00 | 0.75 |
| Cl | .30 | 0.30 | 0.30 | 3.00 | 0.50 |
| F |  |  |  |  | 0.50 |
| CuO | 0.032 | 0.032 | 0.032 | 0.032 | 0.032 |

|  | 21 | 22 | 23 | 24 | 25 |
|---|---|---|---|---|---|
| $B_2O_3$ | 22.1 | 25.0 | 25.0 | 27.1 | 29.4 |
| $La_2O_3$ | 46.8 | 49.0 | 49.1 | 56.8 | 59.0 |
| CdO | 1.0 | 1.1 | 0.6 | 0.6 | 1.1 |
| $Al_2O_3$ | 0.7 | 0.3 | 0.8 | 0.7 | 0.7 |
| $Ta_2O_5$ | 29.4 | 24.6 | 24.5 | 14.8 | 9.8 |
| Ag | 0.75 | 0.75 | 1.25 | 0.75 | 0.75 |
| Cl | 0.50 | 0.50 | 0.25 | 0.25 | 0.50 |
| F | 0.50 |  | 0.50 | 0.50 | 0.50 |
| CuO | 0.032 | 0.032 | 0.032 | 0.032 | 0.032 |

TABLE 1—Continued

|  | 26 | 27 | 28 | 29 | 30 |
|---|---|---|---|---|---|
| $B_2O_3$ | 39.2 | 22.2 | 22.1 | 22.3 | 22.3 |
| $La_2O_3$ | 54.0 | 52.1 | 51.6 | 52.0 | 52.0 |
| CdO | 1.1 | 0.7 | 1.5 | 0.7 | 0.7 |
| $Al_2O_3$ | 0.8 | 0.3 | 0.3 | 0.3 | 0.3 |
| $Ta_2O_5$ | 4.9 | 24.7 | 24.5 | 24.7 | 24.7 |
| Ag | 0.75 | 0.75 | 0.75 | 0.75 | 0.75 |
| Cl | 0.50 | 0.20 | 0.75 | 0.30 | 0.30 |
| Br |  | 0.30 |  |  |  |
| I |  |  | 0.30 |  |  |
| F |  | 0.50 |  |  |  |
| CuO | 0.032 | 0.032 | 0.032 | 0.004 | 0.252 |

Glasses of the above compositions may be prepared in accordance with conventional glass-making practice by weighing out standard batch materials, ballmilling or tumble mixing the batch and melting at 1200°–1400° C. for times ranging from about one to eight hours. However, some care in the cooling, forming, and heat treatment of the glasses is required. As has been explained above, the darkening and bleaching properties of these glasses are due to the presence of submicroscopic crystals of silver halides dispersed in the glassy matrix. These crystals can be produced by cooling the melt relatively slowly, but this procedure often leads to a non-uniform development of the thermal darkening properties, and at silver halide concentrations in excess of about 1%, generally leads to an opalescence of the glass. This opalescence results from significant numbers of silver halide particles growing to a size which will efficiently scatter light. More accurate control over the size and uniformity of the submicroscopic crystals is obtained when the melt is cooled rapidly to a glass such that essentially no silver halide crystallities, or an insignificant size and number of them, are formed. The glass is then heated to a temperature above the strain point thereof for a sufficient length of time to cause the precipitation of the silver halde within the glass.

For compositions containing silver halides in amounts less than about 1%, sufficiently rapid cooling can be accomplished by such a technique as pouring the melt onto a steel plate. At silver halide levels greater than about 1%, the thickness of the poured glass should not exceed about ¼″, or it should be formed by drawing through water-cooled metal rollers or pressing between metal plates into sheets not in excess of about ¼″ thick.

The rapidly cooled glasses may then be annealed and subsequently heat treated at temperatures in excess of the strain point thereof to precipitate the silver halide particles and develop their thermal darkening properties. Normally, temperatures in excess of the softening point of the glass are not employed in the precipitation step inasmuch as such treatment would casue deformation of the glass article. In general, temperatures of about 600°–800° C. are useful in this practice for times of about ¼–8 hours. The lower temperatures of heat treatment are generally required to prevent deformation when high levels of bivalent metal oxides (listed above as RO) are involved.

Table II contains forming methods and heat treating schedules found useful in developing the thermal darkening characteristics of the glasses listed in Table I.

TABLE II

Forming method:
    A—poured on cold steel slab
    B—pressed between two cold steel slabs
Heat treatment:
    A—1 hour at 700° C.
    B—1 hour at 725° C.
    C—1 hour at 750° C.

A measure of the thermal darkening behavior of the glasses of Table I after forming and heat treating according to the methods of Table II, is set forth in Table III. This property may be demonstrated by determining the optical transmittance of a glass plate after bleaching with visible light and again after heating at a specified temperature for a specified period of time. In Table III, $T_C$ represents the percent visible transmission of the clear (bleached) glass after bleaching by exposure to a 250 watt industrial infrared reflector flood lamp at a distance of about 2″, the radiation reaching the glass being filtered to remove ultraviolet radiation by means of a commercial cut-off filter opaque to radiation below 5000 A. The glass is cooled, during bleaching, to room temperature by submersion in flowing water to prevent any darkening due to thermal heating by the lamp.

The transmission of the darkened state, $T_D$, is measured after darkening at three different temperatures; room temperature (approximately 23° C.), 100° C. and 350° C. The darkening at room temperature is obtained by storing the bleached glasses in the dark for 96 hours; at 100° C. by heating the glass in boiling water for 5 minutes; and at 350° C. by heating the glass in an electric furnace for about 20 minutes. These times were deemed sufficient to produce saturation darkening of the glasses at the given temperatures in most cases. The glasses are all cooled to room temperature before measuring.

The optical bleaching efficiencies of the darkened glasses are tested by measuring the change in transmission of

TABLE III

| Sample | Forming method | Heat treatment | Thickness, mm. | $T_C$ | $T_D$ (23° C.) | $T_{B.5}$ | $T_D$ (100° C.) | $T_D$ (350° C.) | $T_{B.5}$ |
|---|---|---|---|---|---|---|---|---|---|
| 1 | A | B | 4.5 | 65 | 20 | 41 | 18 | 13 | 22 |
| 2 | A | C | 4.5 | 56 | 30 | 47 | 29 | 20 | 38 |
| 3 | A | B | 4.4 | 65 | 37 | 48 | 33 | 25 | 33 |
| 4 | A | A | 4.2 | 53 | 27 | 33 | 19 | 17 | 27 |
| 5 | A | B | 4.1 | 66 | 46 | 53 | 39 | 31 | 31 |
| 6 | A | A | 4.2 | 56 | 49 | 49 | 48 | 40 | 44 |
| 7 | A | A | 4.8 | 64 | 34 | 48 | 24 | 17 | 48 |
| 8 | A | A | 4.5 | 78 | 55 | 68 | 45 | 43 | 64 |
| 9 | A | A | 4.4 | 82 | 74 | 79 | 67 | 57 | 75 |
| 10 | A | C | 4.5 | 78 | 43 | 75 | 34 | 30 | 6 |
| 11 | A | C | 4.5 | 74 | 50 | 75 | 41 | 34 | 70 |
| 12 | A | C | 4.8 | 85 | 73 | 85 | 65 | 60 | 84 |
| 13 | A | C | 4.6 | 72 | 24 | 38 | 22 | 18 | 35 |
| 14 | A | C | 4.2 | 62 | 55 | 64 | 51 | 51 | 61 |
| 15 | A | B | 4.0 | 69 | 33 | 54 | 30 | 24 | 40 |
| 16 | A | B | 3.9 | 78 | 36 | 66 | 32 | 30 | 60 |
| 17 | A | B | 4.0 | 79 | 54 | 75 | 49 | 44 | 71 |
| 18 | A | B | 4.0 | 27 | 20 | 21 | 15 | 14 | 15 |
| 19 | B | B | 1.1 | 36 | 24 | 28 | 22 | 11 | 15 |
| 20 | A | C | 4.7 | 18 | 4 | 5 | 3 | 2 | 3 |
| 21 | A | C | 4.6 | 69 | 35 | 45 | 33 | 25 | 32 |
| 22 | A | C | 4.4 | 71 | 42 | 60 | 41 | 29 | 47 |
| 23 | A | C | 4.4 | 16 | 1 | 2 | 1 | 1 | 2 |
| 24 | A | C | 4.5 | 64 | 17 | 43 | 15 | 11 | 28 |
| 25 | A | C | 4.7 | 54 | 22 | 30 | 21 | 12 | 15 |
| 26 | A | C | 4.3 | 72 | 57 | 70 | 49 | 43 | 57 |
| 27 | A | C | 5.5 | 53 | 39 | 46 | 32 | 27 | 35 |
| 28 | A | C | 4.5 | 74 | 56 | 73 | 45 | 44 | 69 |
| 29 | A | C | 4.9 | 52 | 17 | 20 | 11 | 8 | 14 |
| 30 | A | C | 4.9 | 18 | 14 | 17 | 13 | 12 | 13 | visible radiation caused by exposing the darkened glass to visible radiation. After measuring the transmission of the darkened glass, $T_D$, the glass is exposed for 30 seconds to visible radiation produced by the above-mentioned infrared flood lamp at a distance of 10", the radiation being similarly filtered to remove UV radiation. The transmission is again measured. Since, in most cases, complete bleaching is not achieved within 30 seconds, the transmission after 0.5 minute of bleaching, $T_{B.5}$, as compared to the transmission of the darkened state, $T_D$, is an effective measure of the relative bleaching characteristics of the glasses. Table III above shows the bleaching characteristics of this group of glasses after darkening at room temperature and at 350° C.

Among the glasses which are preferred according to the present invention for their excellent thermal darkening characteristics are those consisting essentially in weight percent on the oxide basis as calculated from the batch of 45–65% $La_2O_3$, 25–45% $B_2O_3$, at least 70% $La_2O_3+B_2O_3$, 0–30% $Ta_2O_5$, 0–30% $Nb_2O_5$, 0–25% $ThO_2$, 3–25% RO, wherein RO consists of at least one of the bivalent metal oxides selected from the group consisting of ZnO, CdO, CaO, SrO, BaO, MgO, and PbO, 0.016–0.064% CuO, 0.3–1.5% Ag, 0.2–1.5% Cl and a weight of Ag to Cl ranging between about 1:1 and 4:1.

We claim:

1. A photochromic article comprising a lathanum-borate glass body consisting essentially in weight percent on the oxide basis, of about 15–75% $La_2O_3$, 13–65% $B_2O_3$, at least 35% $La_2O_3+B_2O_3$, .004–0.4% CuO, 0.15–4.0% Ag, and at least one halide in the indicated minimum effective proportion of about 0.1% Cl, 0.1% Br, and 0.1% I, the total of said halide content not exceeding about 1.5%, and the weight ratio of Ag to said halide ranging from about 1:1 to 4:1, said glass body having in at least a portion thereof microcrystals of a silver halide comprising at least about .005% by volume of the glass and being further characterized in that it is dark in its stable state, bleachable to a colorless state by the action of visible light, and thermally darkenable.

2. A photochromic article according to claim 1 which additionally contains, in weight percent on the oxide basis, compatible oxides selected in the indicated proportions from the group consisting of 0–40% $Ta_2O_5$, 0–40% $Nb_2O_5$, 0–15% $Al_2O_3$, 0–45% $ThO_2$, 0–15% $TiO_2$, 0–15% $ZrO_2$, and 0–30% RO, wherein RO is at least one bivalent metal oxide selected from the group consisting of ZnO, CdO, CaO, SrO, BaO, MgO, and PbO.

3. A composition for a lanthanum borate glass which is potentially thermally-darkenable and photochromic consisting essentially, in wight percent on the oxide basis as calculated from the batch, of 15–75% $La_2O_3$ and 13–65% $B_2O_3$, to which are added upon the total weight of the base glass composition, 0.004–0.4% CuO, 0.2–6.0% Ag and at least one halide in the indicated proportion selected from the group consisting of 0.2–1.5% Cl, 0.2–1.5% Br, and 0.2–1.5% I, the weight ratio of Ag to said halide ranging from about 1:1 to 4:1.

4. A composition according to claim 3 wherein $$La_2O_3+B_2O_3$$

totals at least 35% by weight of the batch, which optionally contains, in weight percent on the oxide basis as calculated from the batch, additions of one or more oxides selected in the indicated proportions from the group consisting of 0–40% $Ta_2O_5$, 0–40% $Nb_2O_5$, 0–15% $Al_2O_3$, 0–45% $ThO_2$, 0–15% $TiO_2$, 0–15% $ZrO_2$, and 0–30% RO, wherein RO consists of one or more bivalent metal oxides selected from the group consisting of ZnO, CdO, CaO, SrO, BaO, MgO, and PbO.

5. A composition according to claim 4 wherein CuO is present in amounts ranging from about 0.016–0.064% by weight of the batch.

References Cited

UNITED STATES PATENTS

| | | | |
|---|---|---|---|
| 3,208,860 | 9/1965 | Armistead et al. | 106—52 |
| 3,486,915 | 12/1969 | Bromer et al. | 106—47 R |

FOREIGN PATENTS

| | | | |
|---|---|---|---|
| 1,924,493 | 2/1970 | Germany | 106—52 |
| 2,008,809 | 1/1970 | France | 106—Digest 6 |

JAMES E. POER, Primary Examiner

M. L. BELL, Assistant Examiner

U.S. Cl. X.R.

106—Digest 6; 350—160 P